(12) United States Patent
Baettig et al.

(10) Patent No.: US 7,828,886 B2
(45) Date of Patent: Nov. 9, 2010

(54) ANTHRAPYRIDONE DYES AND THEIR PREPARATION AND USE

(75) Inventors: Kurt Baettig, Le Mouret (CH); Gérald Jan, Villars-sur-Glâne (CH)

(73) Assignee: ILFORD Imaging Switzerland GmbH (CH)

( * ) Notice: Subject to any disclaimer, the term of this patent is extended or adjusted under 35 U.S.C. 154(b) by 0 days.

(21) Appl. No.: 12/586,548

(22) Filed: Sep. 24, 2009

(65) Prior Publication Data

US 2010/0075047 A1     Mar. 25, 2010

(30) Foreign Application Priority Data

Sep. 24, 2008 (EP) .................................. 08165050

(51) Int. Cl.
C09D 11/02 (2006.01)
C07D 221/18 (2006.01)
(52) U.S. Cl. ..................... 106/31.47; 546/76
(58) Field of Classification Search ............. 106/31.47; 546/76; 427/256
See application file for complete search history.

(56) References Cited

U.S. PATENT DOCUMENTS

| | | | |
|---|---|---|---|
| 4,098,783 A * | 7/1978 | Cieciuch et al. ............... | 546/76 |
| 4,626,284 A | 12/1986 | Ohta et al. | |
| 4,703,113 A | 10/1987 | Baxter et al. | |
| 4,740,581 A * | 4/1988 | Pruett et al. .................... | 546/76 |
| 4,963,189 A | 10/1990 | Hindagolla | |
| 6,152,969 A * | 11/2000 | Matsumoto et al. ............ | 546/76 |
| 6,706,102 B2 * | 3/2004 | Blease et al. ............. | 106/31.47 |
| 6,902,607 B2 * | 6/2005 | Matsumoto et al. ...... | 106/31.47 |
| 6,949,135 B2 * | 9/2005 | Ishibashi et al. ......... | 106/31.47 |
| 6,995,266 B2 * | 2/2006 | Shankarling et al. ........... | 546/76 |
| 7,655,085 B2 * | 2/2010 | Shankarling et al. ........... | 546/76 |
| 7,691,191 B2 * | 4/2010 | Matsumoto et al. ...... | 106/31.47 |
| 2002/0017218 A1 | 2/2002 | Baettig et al. | |
| 2002/0121221 A1 | 9/2002 | Baettig | |
| 2004/0068103 A1 | 4/2004 | Baettig | |
| 2008/0022467 A1 | 1/2008 | Baettig et al. | |
| 2008/0257210 A1 | 10/2008 | Baettig et al. | |

FOREIGN PATENT DOCUMENTS

| | | |
|---|---|---|
| EP | 0425150 A2 | 5/1991 |
| EP | 0597672 A2 | 5/1994 |
| EP | 0755984 A1 | 1/1997 |
| EP | 0927747 | 7/1999 |
| EP | 1160291 | 12/2001 |
| EP | 1219682 | 7/2002 |
| EP | 1403328 A1 | 3/2004 |
| EP | 1867685 A1 | 12/2007 |
| EP | 1882723 A1 | 1/2008 |
| GB | 2289473 | 5/1995 |
| JP | 2003-335989 | 11/2003 |
| WO | WO96/24636 | 8/1996 |
| WO | WO98/11167 | 3/1998 |

* cited by examiner

*Primary Examiner*—Helene Klemanski
(74) *Attorney, Agent, or Firm*—Onofrio Law; Dara L. Onofrio, Esq.

(57) ABSTRACT

Anthrapyridone dyes of general formula (III)

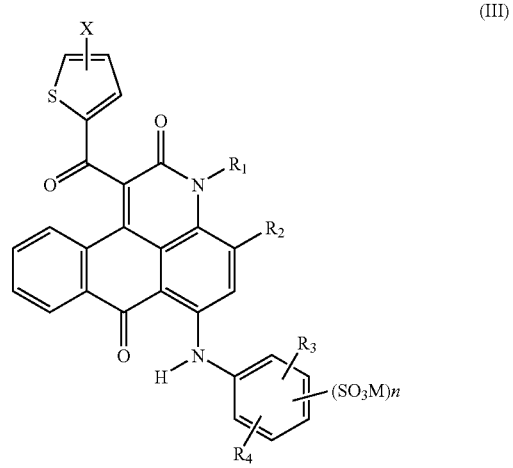

(III)

wherein X, $R_1$, $R_2$, $R_3$, $R_4$, M and n are as defined in the specification, are excellent magenta dyes for dying and printing cellulose containing materials and textile materials and, in particular, for the preparation of recording liquids for ink jet printing.

10 Claims, No Drawings

ANTHRAPYRIDONE DYES AND THEIR PREPARATION AND USE

FIELD OF THE INVENTION

The invention relates to novel anthrapyridone dyes, their salts, a method of their preparation and their use in dying and printing operations. It relates also to liquid dye preparations containing these dyes, in particular to aqueous recording liquids for ink jet printing.

BACKGROUND OF THE INVENTION

Ink jet printing has replaced or complemented in many fields the classical methods of image reproduction. Although ink jet printing has reached a remarkable degree of maturity, further improvements are still necessary, in particular in the graphic and the photographic field. Modern ink jet printers need to furnish in these fields optimal prints on a wide variety of recording sheets such as polymer-based recording sheets or rapidly drying nanoporous recording sheets. In these fields, stability against light and oxidative gases (ozone, $NO_x$), but also a big volume of color space (gamut) of the printed images is primordial. This can be achieved only by using a finely tuned system of recording liquids (respectively the dyes contained therein) adapted to these recording sheets.

Most of the commercially available magenta dyes that are used in recording liquids for ink jet printing do not satisfy all the necessary requirements in combinations with polymer-based and nanoporous recording sheets. The magenta dyes used nowadays do not have all required properties, such as a suitable hue, a very high brilliance (saturation), good light stability, good resistance against degradation by ozone, no dye aggregation on the surface of the recording sheet ("bronzing"), excellent diffusion fastness and excellent solubility and low viscosity in the mainly aqueous recording liquids.

Although quite a number of different magenta dyes have already been proposed as dyes for ink jet printing, none meets all the necessary requirements.

The magenta dyes of formula (I) (example no. 25)

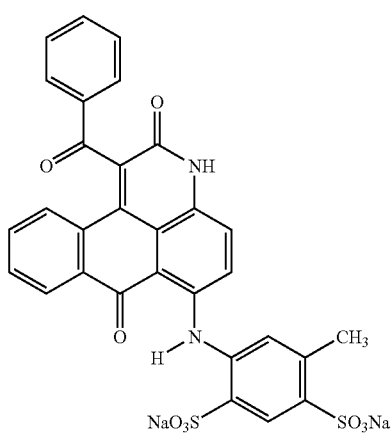

(I)

and of formula (II) (example no. 27)

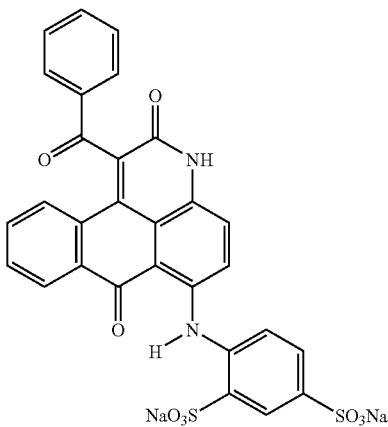

(II)

are described in patent application WO 98/11,167.

These anthrapyridone dyes, representing the state of the art, do not satisfy all the required demands if they are used in the formulation of recording liquids for ink jet printing that should provide magenta images or colorings having a pure and as far as possible bluish hue (values of L*a*b* with elevated values of b*) on any type of recording sheet such as plain or coated paper, coated or uncoated, opaque or transparent synthetic materials. They also should not induce a viscosity increase in the aqueous recording liquids.

Dyes used in such recording liquids need to have a high solubility in the essentially aqueous recording liquid, they have to penetrate into the recording sheet and should not show dye aggregation on the surface of the recording sheet ("bronzing"). They need to provide printed images having high optical density, good water fastness, good light stability and good storage stability even under adverse conditions. They need to be stable in the recording liquid even when the recording liquid is stored for a long time under adverse conditions. Various types of compositions have been proposed as recording liquids. Typical recording liquids comprise one or more dyes or pigments, water, organic co-solvents and other ingredients.

The recording liquids have to satisfy the following criteria:
(1) The recording liquid gives images of excellent quality on any type of recording sheet.
(2) The recording liquid gives images exhibiting good water fastness.
(3) The recording liquid gives images exhibiting good light stability.
(4) The recording liquid gives images exhibiting excellent abrasion resistance.
(5) The recording liquid gives images exhibiting excellent storage stability under conditions of high temperature and humidity.
(6) The recording liquid does not clog jetting nozzles of the ink jet printers even when these are kept uncapped while recording is suspended for long periods.
(7) The recording liquid may be stored for long periods without deterioration of its quality.
(8) The physical properties of the recording liquids, such as viscosity, conductivity and surface tension are all within defined ranges well suited for the intended use.
(9) The recording liquid has to be non-toxic, non-flammable and safe.

SUMMARY OF THE INVENTION

An objective of the invention is to provide novel, well water-soluble anthrapyridone dyes having a pure magenta color with, as far as possible, bluish hue, and, simultaneously, excellent light stability and excellent resistance against degradation by ozone. They provide images or colourings showing overall good properties, in particular in ink jet printing, where they give, together with greenish cyan dyes, as described for example in patent application EP 1,867,685, and citron-yellow yellow dyes, as described for example in patent application EP 0,755,984, images having maximum color rendition.

A further objective of the invention is the provision of liquid dye preparations, in particular of recording liquids for ink jet printing, showing a spectrally unchanged hue on any type of recording sheet such as plain or coated paper, coated or uncoated, opaque or transparent synthetic materials.

A further objective of the invention is the provision of recording liquids satisfying all the requirements mentioned above.

DETAILED DESCRIPTION OF THE INVENTION

The present invention relates to novel anthrapyridone dyes of general formula (III)

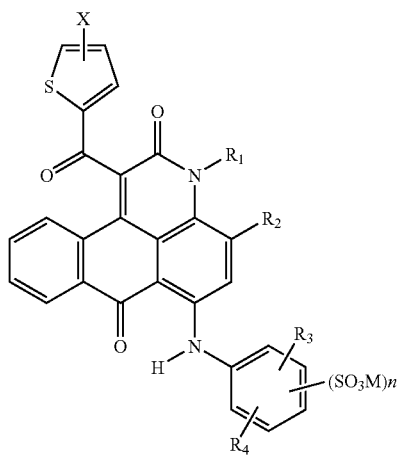

(III)

wherein

X represents hydrogen, chloro, bromo or an unbranched or branched alkyl group each having from 1 to 8 carbon atoms;

$R_1$ represents hydrogen or an unbranched or branched alkyl group each having from 1 to 8 carbon atoms;

$R_2$ represents hydrogen, $SO_3M$, chloro, bromo, an unsubstituted or substituted alkoxy group having up to 12 carbon atoms, where the substituents are selected from the group consisting of COOM, OH, $OCH_3$, halogen, $COOCH_3$ and $COOCH_2CH_3$, or a substituted aromatic aryloxy group, where the substituents are selected from the group consisting of COOM, $SO_3M$, $OCH_3$, halogen, $COOCH_3$ and $COOCH_2CH_3$;

$R_3$, $R_4$ independently represent hydrogen, fluoro, chloro, bromo, $NH_2$, an alkyl group or an alkoxy group each having from 1 to 6 carbon atoms, an unsubstituted aliphatic amide group or sulphonamide group each having up to 12 carbon atoms, or an unsubstituted or substituted aromatic amide group or sulphonamide group each having up to 20 carbon atoms, where the substituents are selected from the group consisting of COOM, $SO_3M$, $OCH_3$, $CH_3$, $CH_2CH_3$, Cl, Br, $COOCH_3$ and $COOCH_2CH_3$;

n is 0, 1 or 2 and

M represents hydrogen, a metal cation or an ammonium cation, optionally substituted by one or more alkyl groups or substituted alkyl groups or hydroxyalkoxyalkyl groups each having from 1 to 18 carbon atoms.

Preferred are anthrapyridone dyes, wherein $R_3$, $R_4$, M and n are as defined above, X represents hydrogen, chloro or bromo;

$R_1$ represents hydrogen or $CH_3$ and $R_2$ represents hydrogen, $SO_3M$ or a phenoxy group.

Particularly preferred are anthrapyridone dyes, wherein X, $R_1$, $R_2$ and n are as defined above, $R_3$, $R_4$ independently represent hydrogen, fluoro, chloro, bromo, $NH_2$, an alkyl group or an alkoxy group each having from 1 to 4 carbon atoms, an unsubstituted amide group or a sulphonamide group each having up to 12 carbon atoms and M represents hydrogen, an alkali metal cation (Li, Na or K), an alkaline earth metal cation (Mg or Ca) or an ammonium cation, optionally substituted by one or more alkyl groups having from 1 to 4 carbon atoms or alkyl groups substituted by OH having from 1 to 6 carbon atoms.

The prepared dyes of general formula (III) are listed in Table 1 together with the position of their absorption maximum in aqueous solution (*: or in a solution of $NMP/H_2O$ 1:1)

TABLE 1

| Dye No. | $R_1$ | n/Position | $R_3$/Position | $R_4$/Position | X | M | $\lambda_{max}$ (nm) |
|---|---|---|---|---|---|---|---|
| 10 | H | 2/2, 5 | H | H | H | K | 531 |
| 11 | H | 2/4, 6 | $OCH_3$/3 | H | H | K | 532 |
| 12 | H | 2/4, 6 | $CH_3$/3 | H | H | Na | 533 |
| 13 | H | 2/3, 6 | $CH_3$/4 | H | H | K | 534 |
| 14 | $CH_3$ | 2/4, 6 | $CH_3$/3 | H | H | Na | 533 |
| 15 | H | 2/4, 6 | $NH_2$/3 | H | H | H | 534 |
| 16 | H | 2/4, 6 | $NHCOCH_3$/3 | H | H | K | 529 |
| 17 | H | 2/4, 6 | NHCHO/3 | H | H | Na | 528 |
| 18 | H | 2/4, 6 | H | H | H | K | 532 |
| 19 | H | 1/4 | H | H | H | Li | 546* |
| 20 | H | 1/3 | H | H | H | Na | 544* |
| 21 | H | 1/2 | H | H | H | K | 547* |

The compounds of general formula (III) may be in the free acid form or in the form of inorganic or organic salts thereof. Preferably, they are in the form of their alkali or ammonium salts, wherein the ammonium cation may be substituted. Examples of such substituted ammonium cations are 2-hydroxyethylammonium, bis-(2-hydroxyethyl)-ammonium, tris-(2-hydroxyethyl)-ammonium, bis-(2-hydroxyethyl)-methylammonium, tris-[2-(2-methoxyethoxy)-ethyl]-ammonium, 8-hydroxy-3,6-dioxaoctylammonium and tetraalkylammonium such as tetramethylammonium or tetrabutylammonium.

The invention does not only relate to pure anthrapyridone dyes of general formula (III), but also to mixtures of these compounds.

The invention also relates to a method of preparation of the dyes of general formula (III) according to the invention, characterized by the fact that a β-ketoester of general formula (IV)

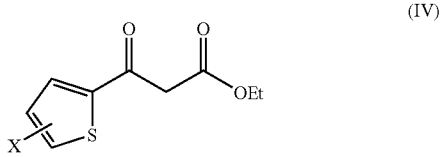

wherein X is defined as above, is reacted with a compound of (V),

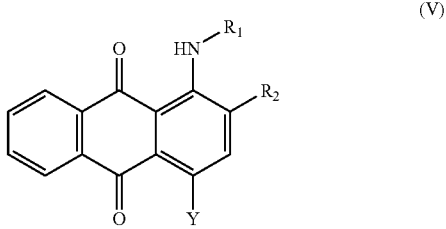

wherein $R_1$ and $R_2$ are defined as above and Y represents chloro, bromo or another leaving group, under conditions that the anthrapyridones of formula (VI) are formed,

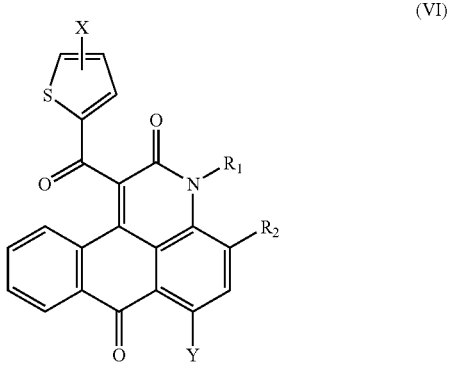

which are subsequently reacted with anilines of general formula (VII), wherein $R_3$, $R_4$ and n are as defined above,

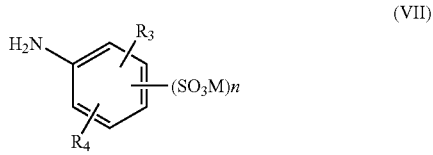

under conditions that the anthrapyridone dyes of general formula (III) according to the invention are formed.

Supplementary sulfo groups may be introduced into the aniline moiety of the anthrapyridone dyes of general formula (III) by a sulfonation reaction, in particular 1 or 2 sulfo groups in the case where n is equal to 0, or 1 sulfo group in the case where n is equal to 1.

The anthrapyridone dyes of general formula (III) according to the invention are used for dying cellulose containing materials, paper, cotton, viscose, leather and wool to provide dyed materials with good water fastness and light stability.

All methods well known in the textile and paper industries for dyeing with substantive dyes may be used, in particular for the bulk or surface treatment of sized or unsized paper. The dyes may also be used in the dyeing of yarns and piece goods of cotton, viscose and linen by the exhaustion process from a long liquor or in a continuous process.

The invention furthermore relates to liquid dye preparations comprising at least one anthrapyridone dye of general formula (III). The use of such liquid dye preparations is particularly preferred for paper dyeing. Such stable, liquid, preferably aqueous, concentrated dye preparations may be obtained by using methods well known in the art, preferably by dissolving in suitable solvents. The possibility of preparation of such stable, aqueous, concentrated preparations in the course of dye synthesis itself, without intermediate isolation of the dye, for example after a desalting step by diafiltration of the reaction solution, is of particular advantage.

The dyes or mixture of anthrapyridone dyes of general formula (III) are excellent dyes for the preparation of recording liquids for ink jet printing.

The anthrapyridone dyes of general formula (III) according to the invention may be combined well with other magenta dyes, in particular with the dyes described in patent applications WO 96/24,636, EP 1,160,291, EP 1,219,682 and EP 1,403,328.

In ink sets for ink jet printing, the anthrapyridone dyes of formula (III) according to the invention, together with yellow dyes, as described for example in patent applications EP 0,755,984 and EP 1,882,723, and cyan dyes, as described for example in patent application EP 1,867,685, span an optimal color space. Further, the dye triple used in the recording liquids have a similar resistance against degradation by light and ozone.

A typical recording liquid comprises one or more of the anthrapyridone dyes according to the invention in a liquid aqueous medium. The recording liquid contains from 0.5 percent by weight to 20 percent by weight, preferably from 0.5 percent by weight to 8 percent by weight, of these anthrapyridone dyes, based on the total weight of the recording liquid. The liquid medium is preferably water or a mixture of water and water-miscible organic solvents. Suitable solvents are described for example in patents U.S. Pat. No. 4,626,284, U.S. Pat. No. 4,703,113 and U.S. Pat. No. 4,963,189 and in patent applications GB 2,289,473, EP 0,425,150 and EP 0,597,672.

The present invention will be illustrated in more detail by the following examples without limiting the scope of the claimed compounds in any way.

EXAMPLES

Example 1

The anthrapyridone dye No. 10 of Table 1, wherein M is K, was prepared in the following way:

Preparation of the Brominated Anthrapyridone Compound of Formula (VIII)

75.5 g (0.25 moles) of 1-amino-4-bromoanthraquinone (available from Sigma-Aldrich GmbH, Buchs, Switzerland), 59.5 g (0.3 moles) of ethyl-3-oxo-3-(thiophene-2-yl)propanate available from Bosche Scientific LLC, New Brunswick, USA), 3.9 g (0.04 moles) of potassium acetate and 125 ml of 1,2-dichlorobenzene were stirred in a nitrogen atmosphere for 22 hours at a temperature of 140° C., distilling off about 12 ml of ethanol. Subsequently, the resulting dispersion was cooled down to room temperature, the product was sucked off, well washed with ethanol and dried. 67.6 g of the product of formula (VIII) were obtained in this way.

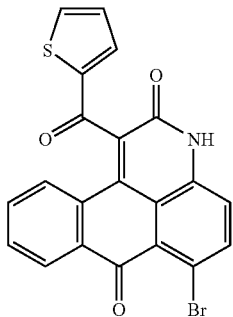

(VIII)

Preparation of the Dye No. 10

4.8 g (15 mmoles) of wet aniline-2,5-disulphonic acid (80%) (available from Bayer AG, Leverkusen, Germany), 3.7 g of (20 mmoles) of tributylamine and 20 ml of N-methylpyrrolidone were heated under glass filter pump vacuum, distilling off about 2 ml to 3 ml of N-methylpyrrolidone and water.

4.4 g (10 mmoles) of bromoanthrapyridone of formula (VIII), 1.9 g (10 mmoles) of tributylamine and 0.2 g of copper (II)-acetate were added to this mixture and stirring of the mixture was continued for 48 hours at a temperature of 150° C. Afterwards, the mixture was cooled down to a temperature of 50° C. and filtered. The dye of formula (10) was precipitated by the addition of 2.5 g of potassium acetate and ethanol and sucked off. The raw dye was suspended in 30 ml of water at a temperature of 80° C., the insoluble part was sucked off and the dye in the filtrate was salted out by an addition of potassium acetate. 1.2 g of dye no. 10 were obtained in this way.

Example of Preparation of a Recording Liquid

The present invention, as far as it relates to recording liquids, is illustrated by the following examples using the dyes of Table 1 according to the invention and dyes representing the state of the art. For each dye, 100 g of recording liquid were prepared by heating the necessary amount of dye (2 g-6 g), ethylene glycol (6 g), propylene-1,2-glycol (3 g), an aqueous solution (50%) of Olin® 10G (available from Arch Chemicals Inc., Norwalk, Conn. USA) (0.2 g), Surfinol® 465 (available from Air Products and Chemicals Inc., Allentown, Pa. USA) (0.3 g) and a solution of a biocide (Mergal® K 10N, available from Riedel-de-Haën, Seelze, Germany) (0.1 g) together with water at a temperature of 50° C. under stirring for approximately 1 hour. For solubility reasons, 20 g of 1-methyl-2-pyrrolidone have to be added for the dyes representing the state of the art. The resulting solution was cooled down to a temperature of 20° C., its value of pH was adjusted to 7.5 and the solution was passed through a Millipore® filter of 0.5 μm pore diameter. The dye quantity was adjusted in such a way that the optical density of the printed image was similar for all dyes.

Example of Application of Recording Liquids

The recording liquids were subsequently printed with an ink jet printer Canon PIXMA IP 4300 onto the following recording sheets:

1: ILFORD OMNIJET Instant Dry Glossy Photo RC Paper ON3GP8 (nanoporous recording sheet)
and
2: ILFORD Galerie Classic Glossy Paper IGCGP9 (polymer based recording sheet)

Tests

1. Dye Solubility

Dye solubility was determined with a spectrophotometer in the visible spectral region in buffered aqueous solutions at a value of pH of 7. Saturated aqueous solutions of the dyes were prepared at a temperature of 50° C. These solutions were afterwards cooled down to room temperature and diluted for the measurements after a waiting time of 24 hours in such a way that the absorption at the absorption maximum was between 0.8 and 1.5. This dilution factor allows the calculation of dye solubility.

2. Color Coordinates

The color coordinates L*a*b* of printed samples were measured with a spectrophotometer Gretag SPM 100 (available from Gretag AG, Regensdorf, Switzerland).

Results

The determined solubilities of the anthrapyridone dye (12) according to the invention and of dye of formula (I) representing the state of the art are listed in Table 2.

TABLE 2

| Dye No. | Solubility in water (percent by weight) |
| --- | --- |
| 12 | 13 |
| I | 3 |

A comparison of the results in Table 2 immediately shows that the anthrapyridone dye no. 12 according to the invention has a much higher water solubility than the dye of formula (I) representing the state of the art.

The measured values of L*a*b* (illuminant $D_{65}$) of the anthrapyridone dye no. 12 according to the invention and of dye of formula (I) representing the state of the art are listed in Table 3.

TABLE 3

| Dye No. | Values of L*a*b* on recording sheet 1 | Values of L*a*b* on recording sheet 2 |
| --- | --- | --- |
| 12 | 79.1/30.3/−18.2 | 50.9/70.2/−29.2 |
| I | 81.4/22.7/−16.1 | 52.7/72.3/−27.5 |

The results in Table 3 clearly show that the anthrapyridone dye no. 12 according to the invention has a more bluish hue than the anthrapyridone dye of formula (I) representing the state of the art.

On nanoporous recording sheet 1, the anthrapyridone dye no. 12 according to the invention is considerably more brilliant than the anthrapyridone dye of formula (I) representing the state of the art.

On polymer-based recording sheet 2, the anthrapyridone dye no. 12 according to the invention has about the same brilliance as the anthrapyridone dye of formula (I) representing the state of the art.

Finally, variations from the examples given herein are possible in view of the above disclosure. Therefore, although the invention has been described with reference to certain preferred embodiments, it will be appreciated that other binders

The invention claimed is:

1. Anthrapyridone dyes of general formula (III)

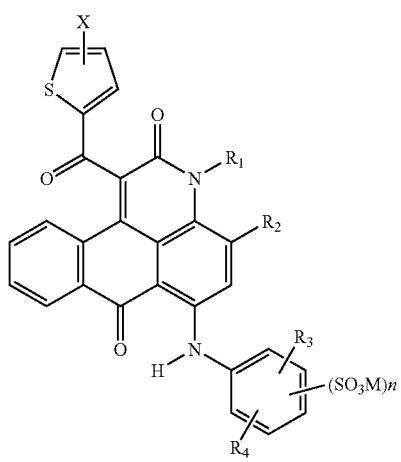

wherein

X represents hydrogen, chloro, bromo or an unbranched or branched alkyl group each having from 1 to 8 carbon atoms;

$R_1$ represents hydrogen or an unbranched or branched alkyl group each having from 1 to 8 carbon atoms;

$R_2$ represents hydrogen, $SO_3M$, chloro, bromo, an unsubstituted or substituted alkoxy group having up to 12 carbon atoms, where the substituents are selected from the group consisting of COOM, OH, $OCH_3$, halogen, $COOCH_3$ and $COOCH_2CH_3$, or a substituted aromatic aryloxy group, where the substituents are selected from the group consisting of COOM, $SO_3M$, $OCH_3$, halogen, $COOCH_3$ and $COOCH_2CH_3$;

$R_3$, $R_4$ independently represent hydrogen, fluoro, chloro, bromo, $NH_2$, an alkyl group or an alkoxy group each having from 1 to 6 carbon atoms, an unsubstituted aliphatic amide group or sulphonamide group each having up to 12 carbon atoms, or an unsubstituted or substituted aromatic amide group or sulphonamide group each having up to 20 carbon atoms, where the substituents are selected from the group consisting of COOM, $SO_3M$, $OCH_3$, $CH_3$, $CH_2CH_3$, Cl, Br, $COOCH_3$ and $COOCH_2CH_3$;

n is 0, 1 or 2 and

M represents hydrogen, a metal cation or an ammonium cation, optionally substituted by one or more alkyl groups or substituted alkyl groups or hydroxyalkoxyalkyl groups each having from 1 to 18 carbon atoms.

2. Anthrapyridone dyes according to claim 1, wherein $R_3$, $R_4$, M and n are defined as in claim 1;

X represents hydrogen, chloro or bromo;

$R_1$ represents hydrogen or $CH_3$ and $R_2$ represents hydrogen, $SO_3M$ or a phenoxy group.

3. Anthrapyridone dyes according to claim 1, characterized by the fact that n is defined as in claim 1;

X represents hydrogen, chloro or bromo;

$R_1$ represents hydrogen or $CH_3$;

$R_2$ represents hydrogen, $SO_3M$ or a phenoxy group;

$R_3$, $R_4$ independently represent hydrogen, fluoro, chloro, bromo, $NH_2$, an alkyl group or an alkoxy group each having from 1 to 4 carbon atoms, an unsubstituted amide group or an unsubstituted sulphonamide group each having up to 12 carbon atoms and M represents hydrogen, an alkali metal cation LI, Na or K, an alkaline earth metal cation Mg or Ca or an ammonium cation, optionally substituted by one or more alkyl groups having from 1 to 4 carbon atoms or alkyl groups substituted by OH having from 1 to 6 carbon atoms.

4. Method of preparation of the anthrapyridone dyes according to claim 1, a β-ketoester of general formula (IV)

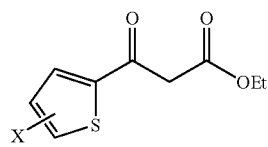

wherein X is as defined in claim 1, with a compound of (V),

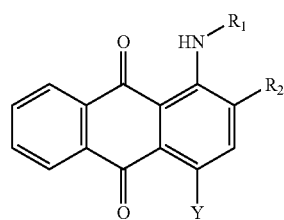

wherein $R_1$ and $R_2$ are defined in claim 1 and

Y represents chloro, bromo or another leaving group, under conditions that the anthrapyridones of formula (VI) are formed,

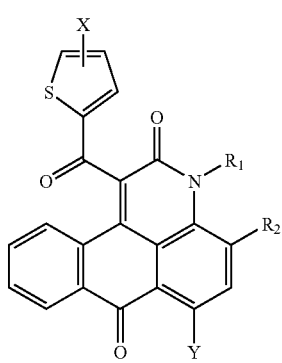

which are subsequently reacted with anilines of general formula (VII), wherein $R_3$, $R_4$ and n are as defined in claim 1,

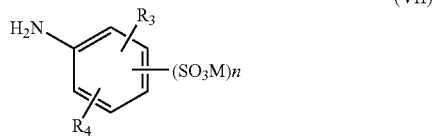

under conditions that the anthrapyridone dyes of general formula (III) are formed.

5. Method of preparation of the anthrapyridone dyes according to claim 1, wherein supplementary sulfo groups are introduced into the aniline moiety of the anthrapyridone dyes of general formula (III) by a sulfonation reaction.

6. Process for recording text and images on recording sheets and for dying and printing natural or synthetic fibre materials, nanoporous materials, leather and aluminum by applying thereto an anthrapyridone dye according to claim 1.

7. Liquid dye preparations comprising at least one anthrapyridone dye or a mixture of anthrapyridone dyes according to claim 1.

8. Liquid dye preparations according to claim 7, comprising in addition one or more other magenta dyes.

9. Recording liquid for ink jet printing, comprising at least one anthrapyridone dye or a mixture of anthrapyridone dyes according to claim 1.

10. Recording liquid for ink jet printing according to claim 9, comprising in addition one or more other magenta dyes.

\* \* \* \* \*

UNITED STATES PATENT AND TRADEMARK OFFICE
CERTIFICATE OF CORRECTION

| | | |
|---|---|---|
| PATENT NO. | : 7,828,886 B2 | Page 1 of 1 |
| APPLICATION NO. | : 12/586548 | |
| DATED | : November 9, 2010 | |
| INVENTOR(S) | : Kurt Baettig and Gerald Jan | |

It is certified that error appears in the above-identified patent and that said Letters Patent is hereby corrected as shown below:

In the claims at:
      Claim 4 line 19 after "according to claim 1," insert -- comprising reacting --

Signed and Sealed this
Fifteenth Day of November, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,828,886 B2 | |
| APPLICATION NO. | : 12/586548 | |
| DATED | : November 9, 2010 | |
| INVENTOR(S) | : Kurt Baettig and Gerald Jan | |

It is certified that error appears in the above-identified patent and that said Letters Patent is hereby corrected as shown below:

In the claims at:

Column 10, line 19 (Claim 4, line 2) after "according to claim 1," insert -- comprising reacting --

This certificate supersedes the Certificate of Correction issued November 15, 2011.

Signed and Sealed this
Twentieth Day of December, 2011

David J. Kappos
*Director of the United States Patent and Trademark Office*